United States Patent [19]
Kawamura et al.

[11] Patent Number: 6,078,783
[45] Date of Patent: *Jun. 20, 2000

[54] DIGITAL TUNER HAVING IEEE 1394 SERIAL BUS INTERFACE FOR PROVIDING A PLURALITY OF SELECTED PROGRAMS AS A FUNCTIONAL UNIT

[75] Inventors: Harumi Kawamura; Makoto Sato, both of Tokyo; Tomoko Tanaka, Kanagawa; Masahiko Sato, Tokyo, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/941,682

[22] Filed: Sep. 30, 1997

[30] Foreign Application Priority Data

Oct. 1, 1996 [JP] Japan .................................. 8-280081

[51] Int. Cl.[7] .............................. H04H 1/02; H04N 7/10; H04L 12/52; H04J 3/02

[52] U.S. Cl. ................................. 455/6.2; 348/8; 348/10; 370/362; 370/439; 370/542

[58] Field of Search ....................................... 348/725, 726, 348/731, 6, 10, 8; 370/357, 360, 431, 438, 439, 442, 458, 498, 537, 542, 362; 455/3.1, 3.2, 3.3, 4.1, 4.2, 6.1, 6.2; 340/825.07, 825.17

[56] References Cited

U.S. PATENT DOCUMENTS 5,689,244  11/1997  Iijima et al. ........................ 340/825.07
5,760,698   6/1998  Iijima et al. ........................ 340/825.17

*Primary Examiner*—John W. Miller
*Attorney, Agent, or Firm*—Frommer Lawrence & Haug, LLP.; William S. Frommer

[57] ABSTRACT

In a digital tuner, a tuner subunit selects a data stream of one or more programs from a data stream in which digital signals of a plurality of programs are multiplexed, and a 1394 interface transmits the selected data stream to an 1394 serial bus. A logical output plug is set in the tuner subunit, and the data stream of the one or more programs is output to the 1394 interface from the output plug.

32 Claims, 8 Drawing Sheets

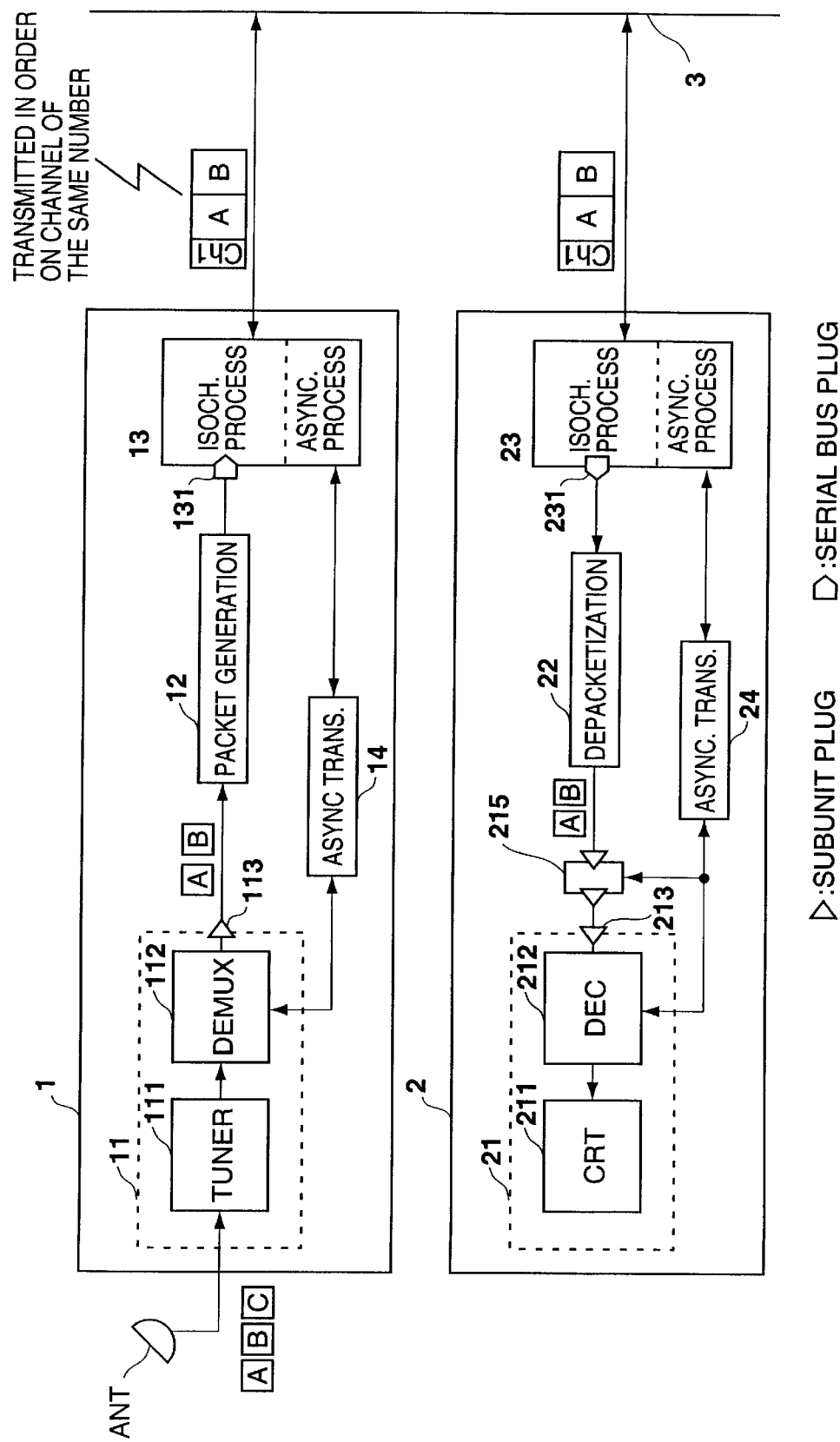

FIG. 6A COMMAND FORMAT

| CTS | CT/RC | HA | OPC | OPR1 | OPR2 | OPR3 |
|---|---|---|---|---|---|---|
| "0"h | KIND OF REQUEST | DESTINATION IN APPARATUS | COMMAND | PARAMETER-1 | PARAMETER-2 | PARAMETER-3 |

FIG. 6B RESPONSE FORMAT

| CTS | CT/RC | HA | OPC | OPR1 | OPR2 | OPR3 |
|---|---|---|---|---|---|---|
| "0"h | KIND OF RESPONSE | SENDER IN APPARATUS | PROCESSED COMMAND | PARAMETER-1 | PARAMETER-2 | PARAMETER-3 |

FIG. 7A CONNECTION CONTROL COMMAND

| CTS | CT/RC | HA | OPC | OPR1 | OPR2 |
|---|---|---|---|---|---|
| "0"h | CONTROL | TUNER UNIT | CONNECTION | FROM TUNER SUBUNIT OUTPUT PLUG | TO TUNER UNIT OUTPUT PLUG |

FIG. 7B CONNECTION ACCEPTANCE RESPONSE

| CTS | CT/RC | HA | OPC | OPR1 | OPR2 |
|---|---|---|---|---|---|
| "0"h | CONTROL | TUNER UNIT | CONNECTION | FROM TUNER SUBUNIT OUTPUT PLUG | TO TUNER UNIT OUTPUT PLUG |

FIG. 7C STATION SELECTION CONTROL COMMAND

| CTS | CT/RC | HA | OPC | OPR1 | OPR2 | OPR3 |
|---|---|---|---|---|---|---|
| "0"h | CONTROL | TUNER SUBUNIT | STATION SELECTION | ADDITION OF RECEPTION TO OUTPUT PLUG | CHANNEL X | PROGRAM A |

FIG. 7D STATION SELECTION ACCEPTANCE RESPONSE

| CTS | CT/RC | HA | OPC | OPR1 | OPR2 | OPR3 |
|---|---|---|---|---|---|---|
| "0"h | CONTROL | TUNER SUBUNIT | STATION SELECTION | ADDITION OF RECEPTION TO OUTPUT PLUG | CHANNEL X | PROGRAM A |

FIG. 7E STATION SELECTION CONTROL COMMAND

| CTS | CT/RC | HA | OPC | OPR1 | OPR2 | OPR3 |
|---|---|---|---|---|---|---|
| "0"h | CONTROL | TUNER SUBUNIT | STATION SELECTION | ADDITION OF RECEPTION TO OUTPUT PLUG | CHANNEL X | PROGRAM B |

FIG. 7F STATION SELECTION ACCEPTANCE RESPONSE

| CTS | CT/RC | HA | OPC | OPR1 | OPR2 | OPR3 |
|---|---|---|---|---|---|---|
| "0"h | CONTROL | TUNER SUBUNIT | STATION SELECTION | ADDITION OF RECEPTION TO OUTPUT PLUG | CHANNEL X | PROGRAM B |

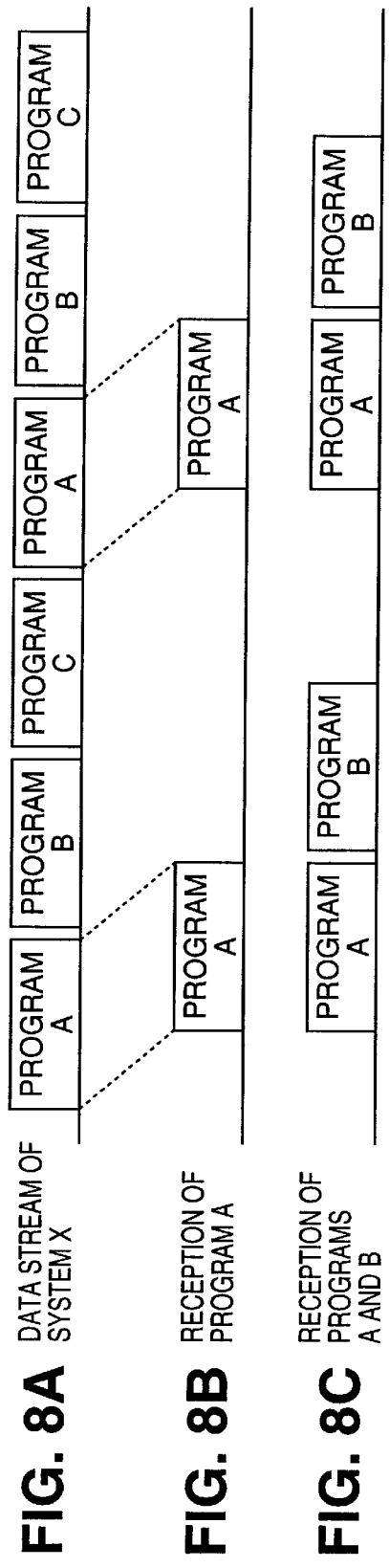

DIGITAL TUNER HAVING IEEE 1394 SERIAL BUS INTERFACE FOR PROVIDING A PLURALITY OF SELECTED PROGRAMS AS A FUNCTIONAL UNIT

BACKGROUND OF THE INVENTION

The present invention relates to a digital tuner having a function of receiving a digital broadcast and outputting a received signal to a bus such as an IEEE 1394 serial bus and, more specifically, to a technique for sending an information signal from a tuner subunit as a functional unit in a digital tuner to an external apparatus or receiving an information from an external apparatus.

There have been proposed systems in which electronic apparatuses such as a digital video cassette recorder, a digital tuner, a monitor, and a personal computer are connected to each other via an IEEE 1394 serial bus (hereinafter referred to as "1394 serial bus" and transmission and reception of information signals such as a digital video signal and a digital audio signal and control signals such as an electronic apparatus operation control command and a connection control command are effected between the electronic apparatuses.

In the above-mentioned systems, for example, to display a data stream separated by a digital tuner on a monitor, it is necessary to set an information signal connection between a tuner subunit as a functional unit in the digital tuner and a monitor subunit as a functional unit in the monitor via a 1394 serial bus and to send a signal to the monitor subunit.

As for the information signal connection, the present inventors previously proposed a logical plug concept (see U.S. patent application Ser. No. 354,119 filed on Dec. 16, 1994). A logical plug proposed therein indicates a serial bus plug, i.e., an information signal inlet/outlet in a unit with respect to the 1394 serial bus. Similarly, a plug concept for prescribing an information signal inlet/outlet in a subunit as a functional unit in a unit is introduced. Therefore, although there exists a means for setting a logical connection between a tuner subunit of a digital tuner and a serial bus output plug of a tuner unit, no means is prescribed that sends or receives an information signal to or from a logical plug of a subunit.

SUMMARY OF THE INVENTION

An object of the present invention is therefore to provide a means for sending an information signal to a logical plug of a tuner subunit of a digital tuner and a means for receiving an information signal by a logical plug of a monitor subunit of a monitor.

The invention provides a digital tuner comprising a selection subunit for selecting a data stream of one or more programs from a data stream in which digital signals of a plurality of programs are multiplexed; and transmitting means for transmitting the selected data stream to a bus, wherein a logical output plug is set in the selection subunit, and the data stream of the one or more programs is output to the transmitting means from the output plug.

According to the invention, a data stream of one or more programs are output from one or more logical output plugs that are set in the subunit.

BRIEF DESCRIPTION OF THE DRAWINGS

FIG. 5 is a block diagram showing details of a system shown in FIG. 2D;

FIGS. 6A and 6B show command and response formats used in a procedure of setting a connection;

FIGS. 7A–7F show examples of commands and responses that are used in selecting and displaying a plurality of programs in the system of FIG. 5; and FIGS. 8A–8C show a concept of selecting and receiving one or more programs from a system that transfers a plurality of programs in multiplexed form.

DESCRIPTION OF THE PREFERRED EMBODIMENTS

Embodiments of the present invention will be hereinafter described in detail with reference to the accompanying drawings.

Figure 1:
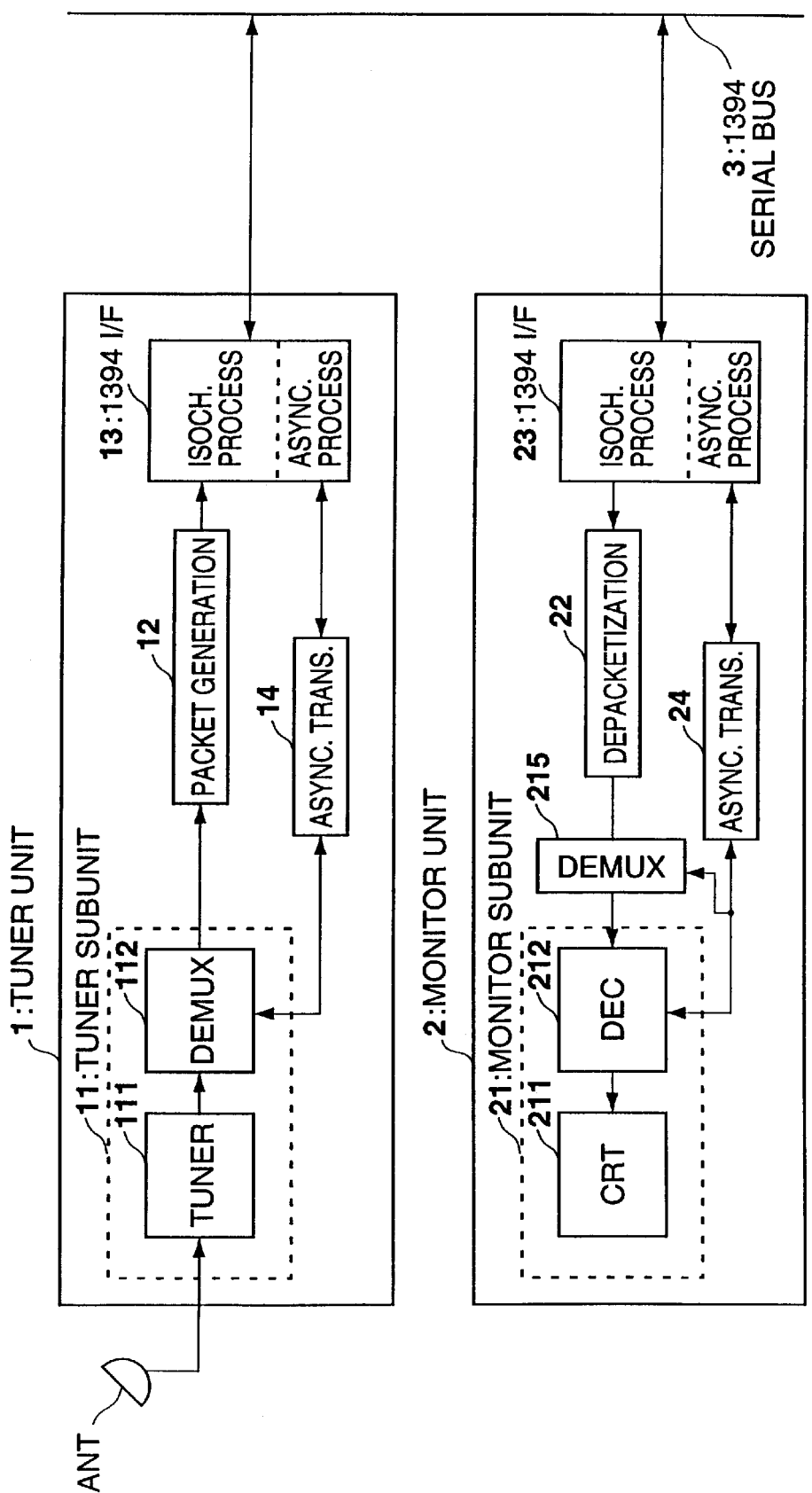
FIG. 1 is a block diagram showing the configuration of a system to which the present invention is applied.

FIG. 1 shows a system to which the invention is applied, in which a tuner unit 1 and a monitor unit 2 are connected to each other via a 1394 serial bus 3.

A tuner unit 1, which is a tuner for receiving a digital satellite broadcast, incorporates a tuner subunit 11, a packet generation block 12, a 1394 interface (hereinafter abbreviated as "1394 I/F") 13, and an asynchronous transaction processing block 14.

The tuner subunit 11 consists of a tuner block 111 and a demultiplexer 112. The tuner block 111 receives a signal that is received by an antenna ANT, and obtains a data stream of a plurality of programs by demodulating one carrier wave corresponding to one desired transponder. That is, in the case of a digital satellite broadcast, a plurality of programs are broadcast by using one frequency. The data stream has been encoded according to MPEG2, for instance. The demultiplexer 112 separates a data stream of one or more desired programs from the data stream obtained by the tuner block 111.

The demultiplexer 112 selects from the plurality of programs coming from the tuner 111. The packet generation block 12 packetizes the data streams separated by the demultiplexer 112.

The 1394 I/F 13 has an isochronous process and an asynchronous process. The isochronous process is a block for executing an isochronous-mode process. The isochronous mode, which is a mode for transferring an information signal every given communication cycle, say, every 125 μsec, is used in transferring such an information signal as a digital video signal or a digital audio signal on a real-time basis. The asynchronous process is a block for executing an asynchronous-mode process. The asynchronous mode is used in transferring a connection control command, a apparatus operation control command, etc. on an irregular basis.

The asynchronous transaction processing block 14 serves for exchange of a command set that is transferred in the asynchronous mode between the demultiplexer 112 and the asynchronous process of the 1394 I/F 13.

The monitor unit 2 incorporates a monitor subunit 21, a depacketization block 22, a DEMUX subunit 215, a 1394 I/F 23, and an asynchronous transaction processing block 24.

The 1394 I/F 23 and the asynchronous transaction processing block 24 are constructed in the same manner as the 1394 I/F 13 and the asynchronous transaction processing block 14 in the tuner unit 1, respectively.

The depacketization block 22 depacketizes a packet that is sent from an isochronous process of the 1394 I/F 23 into a data stream of one or more programs, which is input to the DEMUX subunit 215. If the data stream consists of a plurality of programs, the DEMUX subunit 215 selects from those programs.

The monitor subunit 21 consists of a CRT 211 and a decoder 212. The decoder 212 decodes data streams that are sent from the DEMUX subunit 215 into video signals. When the decoder 212 receives only a data stream of one program, it performs only decoding. The CRT 211 displays pictures based on a video signal that is supplied from the decoder 212. When given a video signal of a plurality of programs, the CRT 211 displays pictures on divided portions of the screen.

Isochronous packets transferred on the 1394 serial bus 3 are input to the 1394 I/F 23 of the monitor unit 2 and then sent to the depacketization block 22 from the isochronous process. Decomposed packets from the depacketization block 22 are decoded into video signals by the decoder 212 of the monitor subunit 21 and supplied to the CRT 211 after being multiplexed. The CRT 211 displays pictures based on the supplied video signal.

In this embodiment, the logical plug concept is used to sending a program that is separated by the tuner subunit 11 of the tuner unit 1 to the 1394 serial bus 3 and to gives it to the monitor subunit 21 via the 1394 I/F 23 of the monitor unit 2. It is noted that the term "subunit" as used herein means a unit portion for realizing a function of an apparatus main body, as will become apparent also from an embodiment described later. Specifically, it refers to the unit portion of the tuner unit 1 that serves as a tuner or the unit portion of the monitor unit 2 that serves as a monitor. From another viewpoint, in terms of this embodiment, the subunits mean functional portions inherent in the apparatuses to perform data transmission and reception with the processing portions for 1394 data communications. A subunit may be constituted only of its function as in the case of a DEMUX subunit.

Figure 2A:
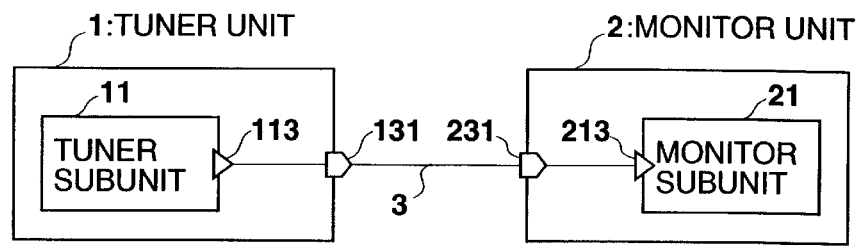
FIGS. 2A–2D conceptually show logical communication paths.
Figure 2B:
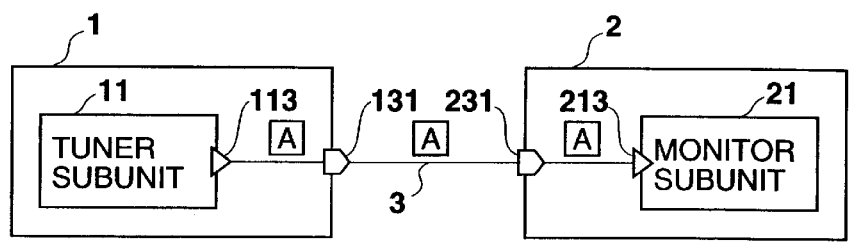

As shown in FIG. 2A, logical connections are set between an output plug 113 of the tuner subunit 11 and a serial bus output plus 131 of the tuner unit 1, between the serial bus out put plug 131 and a serial bus input plug 231 of the monitor unit 2, and between the serial bus input plug 231 and a subunit input plug 213 of the monitor subunit 21. Each of the above plugs is a logical plug. FIG. 2B shows a case that a data stream of one program A selected by the tuner subunit 11 is transferred to the monitor subunit 21 via the logical connection shown in FIG. 2A.

Figure 2C:
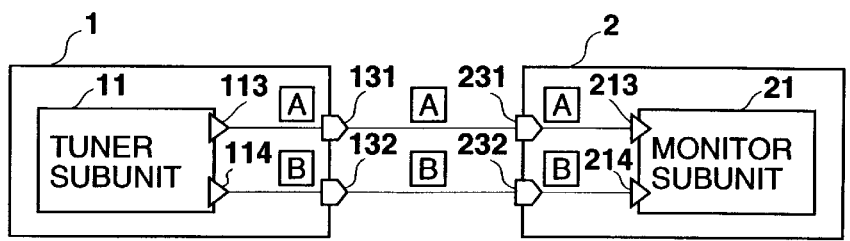
Figure 2D:
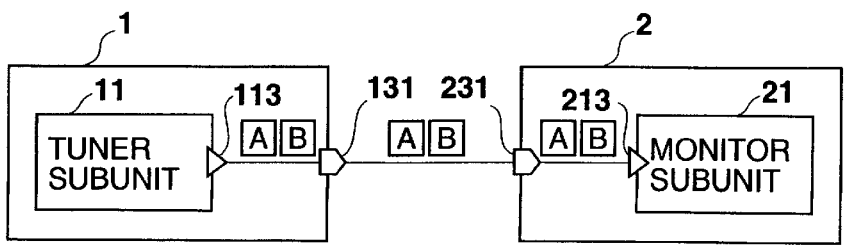

In this embodiment, when a separated program is to be added in the state of FIG. 2B, logical connections are set in two different manners. In the first manner, as shown in FIG. 2C, a new logical connection is set between a subunit output plug 114 of the tuner subunit 11 and a serial bus output plug 132 of the 1394 I/F 13 and between a serial bus input plug 232 of the 1394 I/F 23 and a subunit input plug 214 of the monitor subunit 21. In the second manner, as shown in FIG. 2D, data streams of two programs A and B are transferred by using the single logical connected that is already set. Procedures of setting the above two types of logical connections will be described later in detail. As shown in FIG. 1, a DEMUX subunit may be provided before the monitor subunit 21 to select from a plurality of input programs if necessary.

Figure 3:
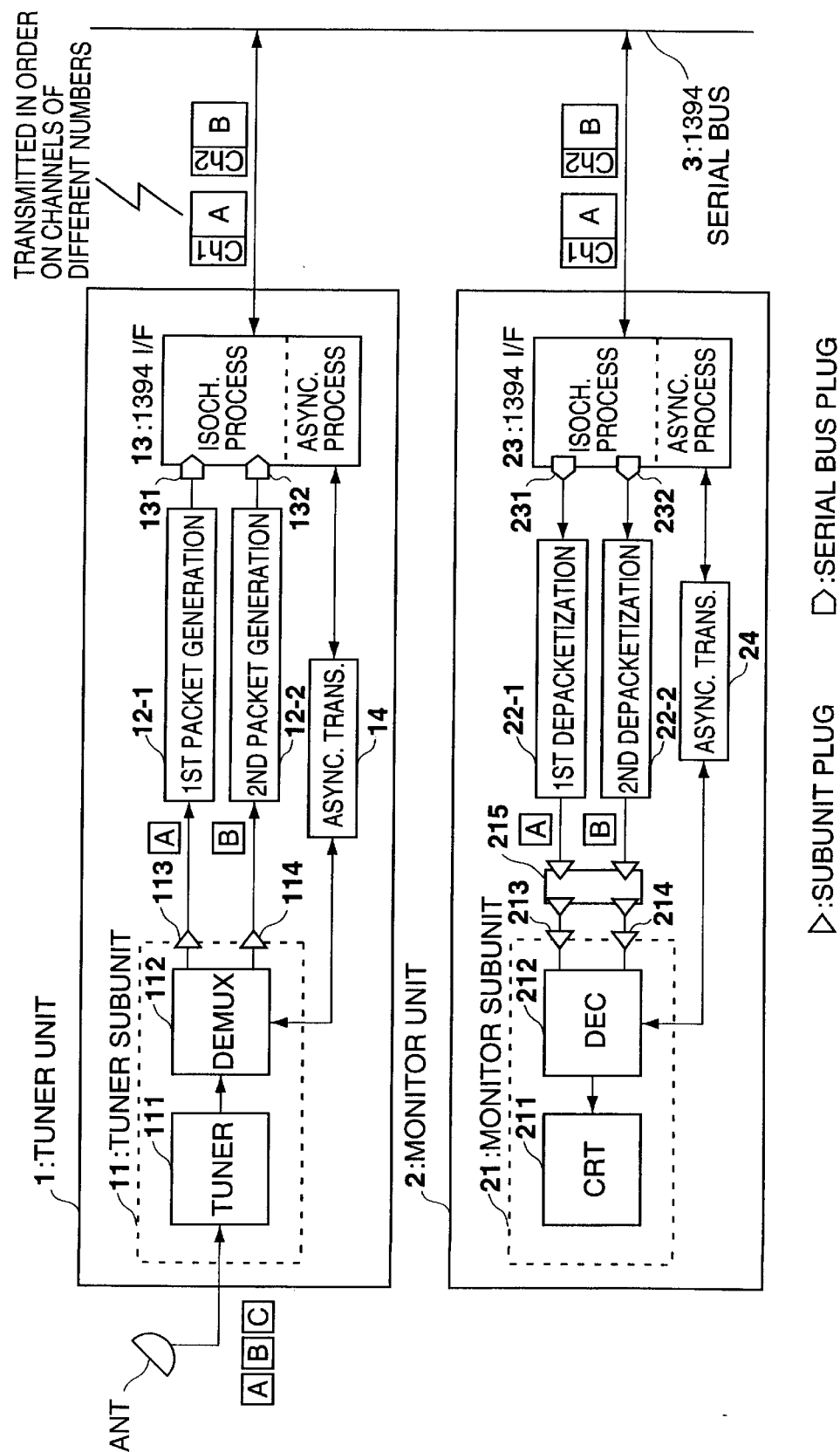
FIG. 3 is a block diagram showing details of a system shown in FIG. 2C.

FIG. 3 is a block diagram showing details of the system shown in FIG. 2C. In FIG. 3, the components corresponding to those in FIG. 1 are given the same reference numerals as used in FIG. 1.

First and second packet generation blocks 12-1 and 12-2 are provided between the subunit output plugs 113 and 114 of the tuner subunit 11 and serial bus output plugs 131 and 132 of the isochronous process of the 1394 interface 13. The first and second packet generation blocks 12-1 and 12-2, which are logical blocks, packetize, on a program-by-program basis, data streams that have been separated by the demultiplexer 112 (in FIG. 3, two programs A and B are separated by the demultiplexer 112).

Similarly, first and second depacketization blocks 22-1 and 22-2 are provided between the subunit input plugs 213 and 214 of the monitor subunit 21 and the serial bus input plugs 213 and 232 of the isochronous process of the 1394 I/F 23. The first and second depacketization blocks 22-1 and 22-2, which are logical blocks, depacketize packets that are sent from the isochronous process of the 1394 I/F 23 into a data stream consisting of one or more programs.

Programs A and B that have been separated by the demultiplexer 112 are separately output from the subunit output plugs 113 and 114 of the tuner subunit 11, separately packetized by the first and second packetization blocks 12-1 and 12-2, and sent to the serial bus output plugs 131 and 132 of the 1394 I/F 13. The serial bus output plugs 131 and 132 are provided corresponding to channels for data to be sent to the 1394 serial bus 3 in the isochronous mode. Therefore, an isochronous packet of program A and that of program B are sent to the 1394 bus 3 by using different channels (channel-1 and channel-2 in FIG. 3).

Isochronous packets transferred on the 1394 serial bus 3 are input to the 1394 I/F 23 of the monitor unit 2, and then sent to the first and second depacketization blocks 22-1 and 22-2 from the serial bus input plugs 231 and 232. Like the serial bus output plugs 131 and 132, the serial bus input plugs 231 and 232 are provided corresponding to channels for data to be input from the 1394 serial bus 3 in the isochronous mode. Packets are depacketized by the first and second depacketization blocks 22-1 and 22-2 into data streams of programs A and B, which are input to the subunit input plugs 213 and 214 of the monitor subunit 21. The DEMUX subunit 215 as a logical block is provided before the subunit input plugs 213 and 214, to constitute logical plugs for respective inputs and outputs. Although the DEMUX subunit 215 is effective in, for instance, a case of FIG. 5 (described later), it does not perform any substantial operation (i.e., it is just passed through) when programs A and B are input and output via separate plugs as in the case being considered. The data streams are decoded the decoder 212 into a video signal, which is supplied to the CRT 211. Based on the received video signal, the CRT 211 displays pictures of programs A and B on divided portions of the screen.

Figure 4:
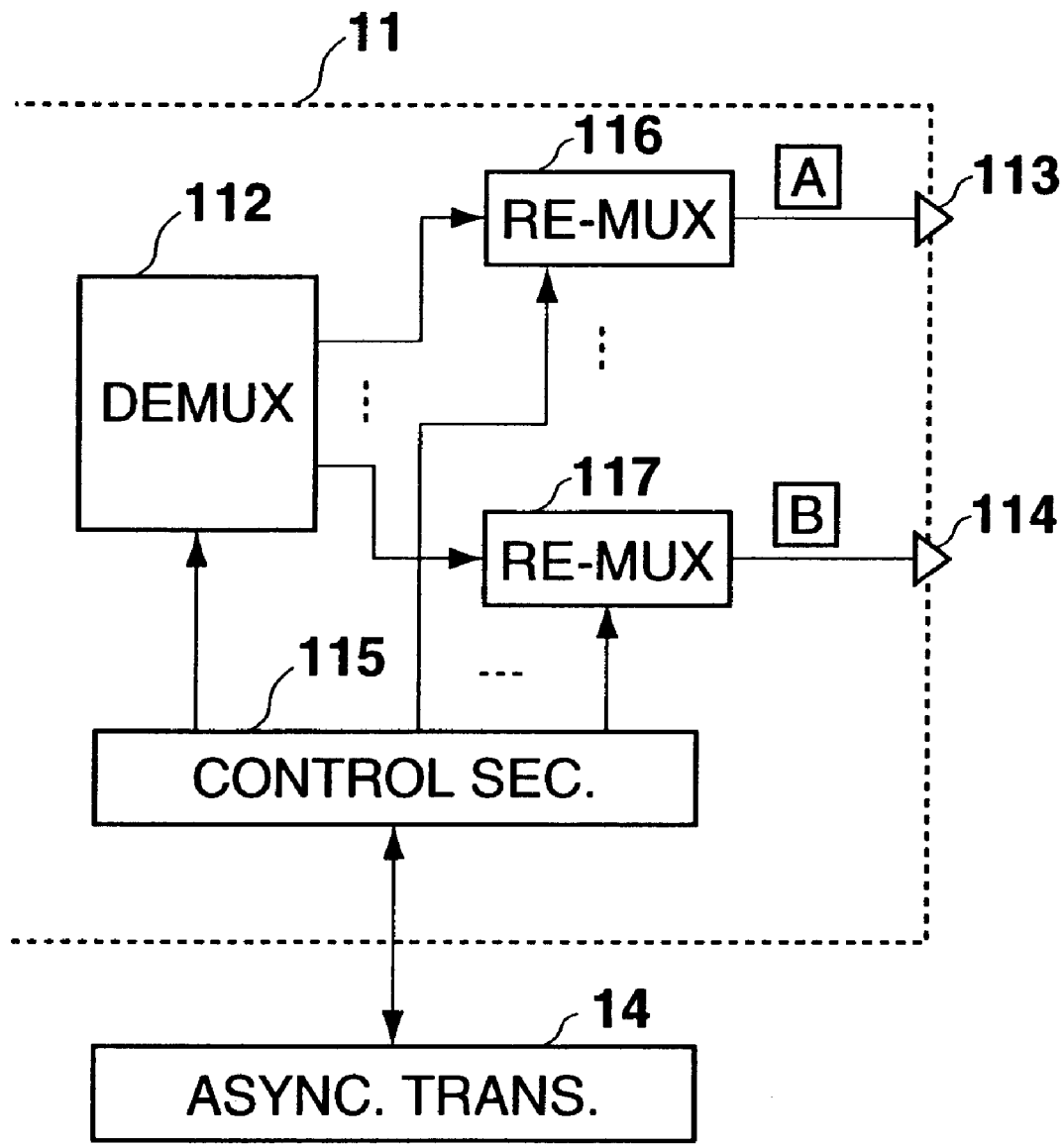
FIG. 4 shows an output section of a demultiplexer shown in FIG. 3.

In the above operation, as shown in FIG. 4, in the tuner subunit 11, a control section 115 controls the demultiplexer 112 and remultiplexers 116 and 117 in accordance with commands sent from the asynchronous transaction processing block 14, whereby data streams of programs A and B are output from the subunit output plugs 113 and 114. The remultiplexers 116 and 117 are logical blocks and are actually functions of the demultiplexer 112. Although in FIG. 4 outputs of the remultiplexers 116 and 117 are supplied to the subunit output plugs 113 and 114, it goes without saying that remultiplexers and subunit output plugs can be provided in three or more pairs.

FIG. 5 is a block diagram showing details of the system shown in FIG. 2D. In FIG. 5, the components corresponding to those in FIG. 1 are given the same reference numerals as used in FIG. 1.

As shown in FIG. 5, a packet generation block 12 is provided between the subunit output plug 113 of the tuner subunit 11 and the serial bus output plug 131 of the isochronous process of the 1394 I/F 13. The subunit output plug 113 can output data streams of a plurality of programs in order. The packet generation block 12, which is a logical block, can packetize data streams of a plurality of programs in order. The serial bus output plug 131 of the 1394 I/F 13 can receive packets generated by the packet generation block 12. Since the serial bus output plug 131 is provided corresponding to a channel for data to be sent to the 1394 serial bus 3 in the isochronous mode, isochronous packets of a plurality of programs can be sent to the 1394 serial bus 3 on the same channel (in FIG. 5, channel-1).

Similarly, a depacketization block 22 is provided between the subunit input plug 213 of the monitor subunit 21 and the serial bus input plug 231 of the isochronous process of the 1394 I/F 23. The serial bus input plug 231 of the 1394 I/F 23 can transmit isochronous packets to the depacketization block in order. The depacketization block 22, which is a logical block, can depacketize packets into a data stream. The subunit input plug 213 of the monitor subunit 21 can receive a data stream. As described above, a DEMUX subunit 215 is logically provided before the subunit input plug 213 to select program A or B and supply it to the subunit input plug 213. The DEMUX subunit 215 itself has logical input and output plugs.

Programs A and B separated by the demultiplexer 112 are sequentially output from the subunit output plug 113 of the tuner subunit 11, sequentially output from the subunit output plug 113, sequentially packetized by the packet generation block 12, and sent to the serial bus output plug 131 of the 1394 I/F 13. The serial bus output plug 131 is provided corresponding to a channel for data to be sent to the 1394 serial bus 3 in the isochronous node. Therefore, an isochronous packet of program A and that of program B are sent to the 1394 serial bus on the same channel (in FIG. 5, channel-1).

An isochronous packet transferred on the 1394 serial bus 3 is input to the 1394 I/F 23 of the monitor unit 2, and then sent to the depacketization block 22 from the serial bus input plug 231. Like the serial bus output plug 131, the serial bus input plug 231 is provided corresponding to a channel for data to be input from the 1394 serial bus 3 in the isochronous mode. Packets depacketized by the depacketization block 22 become a data stream consisting of programs A and B. The data stream is decomposed into programs A and B by the DEMUX subunit 215, and input to the subunit input plug 213 of the monitor subunit 21. The data stream is decoded by the decoder 212 into a video signal, and supplied to the CRT 211 after being multiplexed. The CRT 211 displays pictures of programs A and B on divided portions of the screen based on the received video signal.

Next, a description will be made of a procedure of setting a logical connection in each of the tuner subunit 1 and the monitor subunit 2.

FIGS. 6A and 6B show command and response formats that are used in the procedure of setting a connection. The value "0"h of a CTS (command transaction set) at the head of each format means an AV/C (audio-video/control) command set according to the 1394 serial bus protocol. A CT/RC (commandtype/response-code) represents the kind of request in a command and the kind of response in a response. A HA (header-address) represents a destination in an apparatus. An OPC (operation-code) and OPRs (operands) indicate a command and its parameters, respectively.

FIGS. 7A–7F show examples of commands and responses that are used in selecting and displaying a plurality of programs in the system of FIG. 5. Commands and responses are transferred in the asynchronous mode. More specifically, the asynchronous process of the I/F 13 and the asynchronous transaction processing block 14 process those in the tuner unit 1, and the asynchronous process of the I/F 23 and the asynchronous transaction processing block 24 process those in the monitor unit 2.

First, in the tuner unit 1 in a state that no internal connection is set, a first internal connection is set from the subunit plug 113 of the tuner subunit 11 to the serial bus output plug 131 of the 1394 I/F 13. In this case, the monitor unit 2 sends a connection control command shown in FIG. 7A to the tuner unit 1. Upon reception of this command, the tuner unit 1 sets the internal connection and returns a connection acceptance response shown in FIG. 7B to the monitor unit 2.

Further, the monitor unit 2 sets an internal connection from the serial bus input plug 231 of the 1394 I/F 23 to the subunit input plug 213 of the monitor subunit 21.

Further, an external connection, i.e., a logical connection via the 1394 serial bus 3, is set between the serial bus input plug 231 of the monitor unit 2 and the serial bus output plug 131 of the tuner unit 1. Since a method for setting an external connection is described in detail in the above-mentioned U.S. patent application Ser. No. 354,119, for instance, it is not described here.

Thus, connections of a communication path for outputting a signal received and selected by the tuner subunit 11 to the monitor subunit 21. FIG. 2A shows the concept of this communication path.

If at this time point a user makes a request for selecting channel X at which system X (for instance, digital video broadcast (DVB)) that performs multiplexed broadcast of a plurality of programs is preset from among channels preset in the tuner subunit 11 and for receiving therefrom one program, i.e., program A, a control for execution of a reception is performed according to the following procedure. FIGS. 8A and 8B conceptually show an operation of selecting and receiving program A from system X that broadcasts a plurality of programs in multiplexed form.

First, the monitor unit 2 on the control side transmits, to the tuner subunit 21 as a control subject, a station selection control command for "execution of a reception by selecting program A from channel X at which system X is preset." FIG. 7C shows a communication packet format that is used at this time. Although there is a parameter "addition of reception to plug," it means execution of new setting because no reception has been executed at this time point.

If a station selection acceptance response shown in FIG. 7D is returned from the tuner subunit 11, a signal of program A of system X is transferred to the monitor subunit 21 on the communication path shown in FIG. 2A that has been set according to the above-described procedure. FIG. 2B shows the concept of this state.

Next, a consideration will be given to a case where a user makes a request for receiving program B from the same system X at the same time as program A. In this case, the monitor unit 2 on the control side sends a command for adding a reception of program B to the tuner subunit 11 that is set for reception on channel X. FIG. 7E shows a packet format of a station selection control command used at this time.

If the tuner subunit 11 returns a station selection acceptance response shown in FIG. 7F, signals of programs A and B of system X are transferred in multiplexed form to the monitor subunit 21 on the already set communication path. FIG. 2D shows the concept of this state. FIG. 8C conceptually shows an operation of selecting and receiving programs A and B from system X that broadcasts a plurality of programs in multiplexed form.

In the system shown in FIG. 3 in which a new connection is set to receive program B, a new communication path for outputting a signal received by the tuner subunit 11 to the monitor subunit 21 is secured by performing again controls of setting internal connections in the tuner unit 1 and the monitor unit 2 and an external connection between the tuner unit 1 and the monitor unit 2, according to the same procedure as described above. FIG. 2C shows the concept of this state.

In contrast, in the system shown in FIG. 5, another program can be selected and received from the same channel at the same time if plugs for receiving a multiplexed broadcast already exist; it is not necessary to perform controls for setting a separate connection.

Although the embodiment is directed to the case of using the monitor unit, various modifications are conceivable that use a VCR unit for storing programs or some other unit. In the case of using a VCR unit, programs selected by a DEMUX subunit can be recorded selectively by providing a VCR subunit.

As described above in detail, according to the invention, in a digital tuner having a selection subunit for selecting a data stream of one or more programs from a data stream in which digital signals of a plurality of programs are multiplexed and transmitting means for transmitting the selected data stream to a bus, it becomes possible to set a logical connection between the selection subunit and the transmitting means.

What is claimed is:

1. A data transfer apparatus comprising:
   a tuner for selecting a data stream of one or more programs from a plurality of data streams in which digital signals of a plurality of programs are multiplexed;
   selection/demultiplexing means for demultiplexing said selected data stream and for selecting a plurality of programs from said demultiplexed data stream; and
   transmitting means for transmitting the plurality of selected programs to a bus,
   wherein a logical output plug is set in the selection/demultiplexing means, and the plurality of programs are output to the transmitting means from the output plug and when at least one data stream or program is newly selected by said tuner or said selection/demultiplexing means, a new logical output plug is set in the selection/demultiplexing means.

2. The data transfer apparatus according to claim 1, wherein a logical plug is set in the transmitting means, and the plurality of selected programs are output to the bus from the output plug of the transmitting means.

3. The data transfer apparatus according to claim 1, wherein the bus is an IEEE 1394 serial bus.

4. The data transfer apparatus according to claim 1, wherein the tuner of the data transfer apparatus is a digital tuner, and includes the selection/demultiplexing means, and the transmitting means is an interface for the bus.

5. The data transfer apparatus according to claim 1,
   wherein said transmitting means receives the newly selected data stream or program from said newly set logical output plug of said tuner or said selection/demultiplexing subunit and transmits the newly selected data stream or program to the bus via a new channel which is different from a channel used to transmit the previously selected data stream or program.

6. A data receiving apparatus for receiving, via a bus, a data stream in which digital signals of a plurality of programs are multiplexed, comprising:
   receiving means for receiving the data stream including said plurality of programs from the bus; and
   decoding/demultiplexing means for demultiplexing the received data stream into said plurality of programs, and for decoding each of said plurality of programs into a digital signal,
   wherein a logical input plug is set in the decoding/demultiplexing means, and the data stream including the plurality of programs is input from the receiving means via the input plug and when at least one data stream or program is newly received by said receiving means, a new logical input plug is set in the decoding/demultiplexing means.

7. The data receiving apparatus according to claim 6, wherein a logical input plug is set in the receiving means, and the data stream including the one or more programs is received from the bus via the input plug of the receiving means.

8. The data receiving apparatus according to claim 6, wherein the bus is an IEEE 1394 serial bus.

9. The data receiving apparatus according to claim 6, wherein the data receiving apparatus is applied to a monitor apparatus, and wherein the decoding/demultiplexing means is provided in a monitor subunit and the receiving means is an interface for the bus.

10. The data receiving apparatus according to claim 6,
    wherein said newly received data stream or program is transmitted via a new channel which is different from a channel used to transmit the previously received data stream or program.

11. A control method for a data transfer apparatus, comprising the steps of:
    selecting, with a tuner, a data stream including a plurality of programs from a plurality of data streams in which digital signals of a plurality of programs are multiplexed;
    demultiplexing said selected data stream;
    selecting a plurality of said programs from said demultiplexed data stream; and
    transmitting, with transmitting means, the plurality of selected programs to a bus from transmitting means,
    wherein a logical output plug is set, and the data stream including said plurality of programs is output to the transmitting means from the output plug and when at least one data stream or program is newly selected, a new logical output plug is set.

12. The control method according to claim 1, wherein the data transfer apparatus is applied to a digital tuner.

13. The control method according to claim 11,
    wherein said transmitting means receives the newly selected data stream or program from said newly set logical output plug and transmits the newly selected data stream or program to the bus via a new channel which is different from a channel used to transmit the previously selected data stream or program.

14. A control method for a data receiving apparatus for receiving, via a bus, a data stream in which digital signals of a plurality of programs are multiplexed, comprising the steps of:
    receiving, with receiving means, the data stream including said plurality of programs from the bus;
    demultiplexing said data stream into said plurality of programs; and
    decoding each of said plurality of programs of the received data stream into a digital signal, wherein a logical input plug is set, and the data stream including the plurality of programs is input from the receiving means via the input plug and when at least one data stream or program is newly received by said receiving means, a new logical input plug is set.

15. The control method according to claim 14, wherein the data receiving apparatus is applied to a monitor device.

16. The control method according to claim 14,
wherein said newly received data stream or program is transmitted via a new channel which is different from a channel used to transmit the previously received data stream or program.

17. A data receiving apparatus for receiving, via a bus, a data stream in which digital signals of plurality of programs are multiplexed, comprising:
receiving means for receiving the data stream from the bus; and
demultiplexing means for decomposing the received data stream into a plurality of programs,
wherein a logical input plug is set in the demultiplexing means, and the data stream including the plurality of programs is input from the receiving means via the input plug and when at least one data stream or program is newly supplied to said demultiplexer means a new logical input plug is set in the demultiplexer means.

18. The data receiving apparatus according to claim 17,
wherein said newly supplied data stream or program is received via a new channel which is different from a channel used to receive the previously supplied data stream or program.

19. A control method for a data receiving apparatus for receiving, via a bus, a data stream in which digital signals of a plurality of programs are multiplexed, comprising the steps of:
receiving, with receiving means, the data stream from the bus; and
decomposing, with a demultiplexer subunit, the received data stream into a plurality of programs,
wherein a logical input plug is set in the demultiplexer subunit, and the data stream including the plurality of programs is input from the receiving means via the input plug and when at least one data stream or program is newly supplied to said demultiplexer subunit, a new logical input plug is set in the demultiplexer subunit.

20. The control method according to claim 19,
wherein said newly supplied data stream or program is received via a new channel which is different from a channel used to receive the previously supplied data stream or program.

21. A data transfer apparatus comprising:
a tuner subunit for selecting a data stream of a plurality of programs from a plurality of data streams in which digital signals of a plurality of programs are multiplexed;
a selection/demultiplexing subunit for demultiplexing said selected data stream and for selecting a plurality of programs from said demultiplexed data stream; and
a transmitter for transmitting the selected plurality of programs to a bus,
wherein a logical output plug is set in the selection/demultiplexing subunit, and the plurality of programs is output to the transmitter from the output plug and when at least one data stream or program is newly selected, a new logical output plug is set in the selection/demultiplexing subunit.

22. The data transfer apparatus according to claim 21, wherein a logical plug is set in the transmitter, and the data stream of the plurality of programs are output to the bus from the output plug of the transmitter.

23. The data transfer apparatus according to claim 17, wherein the bus is an IEEE 1394 serial bus.

24. The data transfer apparatus according to claim 21, wherein the data transfer apparatus is applied to a digital tuner, and wherein the tuner and the selection/demultiplexing subunit is provided in a digital tuner subunit and the transmitter is an interface for the bus.

25. The data transfer apparatus according to claim 21,
where in said transmitter receives the newly selected data stream or program from said newly set logical output plug of said selection subunit and transmits the newly selected data stream or program to the bus via a new channel which is different from a channel used to transmit the previously selected data stream or program.

26. A data receiving apparatus for receiving, via a bus, a data stream in which digital signals of a plurality of programs are multiplexed, comprising:
a receiver for receiving the data stream including said plurality of programs from the bus; and
a decoding/demultiplexing subunit for demultiplexing the received data stream into said plurality of programs, and for decoding each of said plurality of programs into a digital signal;
wherein a logical input plug is set in the decoding/demultiplexing subunit, and the data stream including the plurality of programs is input from the receiver via the input plug and when at least one data stream or program is newly received by said receiver, a new logical input plug is set in the decoding/demultiplexing subunit.

27. The data receiving apparatus according to claim 26, wherein a logical input plug is set in the receiver, and the data stream including the plurality of programs is received from the bus via the input plug of the receiver.

28. The data receiving apparatus according to claim 26, wherein the bus is an IEEE 1394 serial bus.

29. The data receiving apparatus according to claim 26, wherein the data receiving apparatus is applied to a monitor apparatus, and wherein the decoding/demultiplexing subunit is provided in a monitor subunit and the receiving means is an interface for the bus.

30. The data receiving apparatus according to claim 26,
wherein said newly received data stream or program is transmitted via a new channel which is different from a channel used to transmit the previously received data stream or program.

31. A data receiving apparatus for receiving, via a bus, a data stream in which digital signals of a plurality of programs are multiplexed, comprising:
a receiver for receiving the data stream from the bus; and
a demultiplexer subunit for decomposing the received data stream into a plurality of programs,
wherein a logical input plug is set in the demultiplexer subunit, and the data stream including the plurality of programs is input from the receiver via the input plug and when at least one data stream or program is newly supplied to said demultiplexer subunit, a new logical input plug is set in the demultiplexer subunit.

32. The data receiving apparatus according to claim 31,
wherein said newly supplied data stream or program is received via a new channel which is different from a channel used to receive the previously supplied data stream or program.

* * * * *